United States Patent

Schmidt et al.

[11] Patent Number: 6,090,005
[45] Date of Patent: Jul. 18, 2000

[54] TWO-MODE, COMPOUND-SPLIT, VEHICULAR TRANSMISSION HAVING BOTH ENHANCED SPEED AND ENHANCED TRACTIVE POWER

[75] Inventors: Michael Roland Schmidt; Donald Klemen, both of Carmel, Ind.

[73] Assignee: General Motors Corporation, Detroit, Mich.

[21] Appl. No.: 09/360,791

[22] Filed: Jul. 26, 1999

[51] Int. Cl.[7] ........................................................ F16H 3/72
[52] U.S. Cl. ........................................................ 475/5; 475/2
[58] Field of Search ................................ 475/5, 149, 2; 477/2, 3, 4, 5

[56] References Cited

U.S. PATENT DOCUMENTS

| | | | |
|---|---|---|---|
| 5,558,589 | 9/1996 | Schmidt | 475/5 |
| 5,931,757 | 8/1999 | Schmidt | 475/5 |
| 5,935,035 | 8/1999 | Schmidt | 475/5 |

*Primary Examiner*—Charles A Marmor
*Assistant Examiner*—Tisha D. Waddell
*Attorney, Agent, or Firm*—Dean L. Ellis

[57] ABSTRACT

A two-mode, compound-split, hybrid transmission having an input member for receiving power from a prime mover power source and an output member for delivering power from the transmission. The transmission utilizes four planetary gear sub sets, three torque transfer devices as well as first and second supplemental power receiving/delivery units—either electric motor/generator units or hydrostatic pump/motor units. At least one of the gear members in the first and second planetary gear sub sets are connected to the first supplemental power receiving/delivery units, and at least one of said gear members in the second, third and fourth planetary gear sub sets are continuously connected to the second supplemental power receiving/delivery units. Torque transfer devices selectively connect the carriers associated with the first, second and fourth planetary gear sub sets to each other and to the output member. Another torque transfer device selectively connects the carrier associated with the third planetary gear sub set to ground. That gear member of the third planetary gear sub set not connected to the second supplemental power receiving/delivery unit is connected to the carrier of the fourth planetary gear sub set. The third torque transfer device selectively grounds that gear member of the fourth planetary gear sub set not connected to the second supplemental power receiving/delivery unit.

16 Claims, 7 Drawing Sheets

TWO-MODE, COMPOUND-SPLIT, VEHICULAR TRANSMISSION HAVING BOTH ENHANCED SPEED AND ENHANCED TRACTIVE POWER

TECHNICAL FIELD

The present invention relates broadly to vehicular transmissions. In general, the present invention relates to two-mode, compound-split, vehicular transmissions. More particularly, the present invention relates to two-mode, compound-split, vehicular transmissions that utilize supplemental power receiving/delivery units that may derive their power either directly or indirectly from the vehicle engine and selectively impart it to the compounded planetary gear sub sets in the transmission. Specifically, the present invention relates to two-mode, compound-split, electro-mechanical (as well as two-mode, compound-split, hydro-mechanical) vehicular transmissions so long as such transmissions are capable of a unique gearing path, or mode, for reverse operation that provides enhancement to both the speed and tractive power available from the transmission.

BACKGROUND OF THE INVENTION

The purpose of a vehicular transmission is to provide a neutral, at least one reverse and one or more forward driving ranges that impart power from an engine, and/or other power sources, to the drive members which deliver the tractive effort from the vehicle to the terrain over which the vehicle is being driven. As such, the drive members may be the front wheels, the rear wheels, both the front and the rear wheels or a track, as selected, to provide the desired interaction with the terrain.

The present invention is not to be confused with a series propulsion system. A series propulsion system is a system in which power follows a path from an engine to an electrical storage device and then to an electric motor which applies the power to rotate the drive members. There is no direct mechanical connection between the engine and the drive members in a series propulsion system.

Transmissions adapted to receive the output power from either an engine or an electric motor, or both, as well as transmissions adapted to receive the output power from either an engine or a hydro-mechanical device, or both, have heretofore relied largely on what has been designated as series, hybrid propulsion systems. Such systems have not, heretofore, accommodated high-average power vehicles nor do they provide duty cycles that demand continuous, constant speed operation. The provision of high tractive effort at desired high efficiencies is not readily achievable with a typical, series, hybrid transmission configuration, particularly in reverse.

The challenge, therefore, is to provide a transmission that will operate at high efficiencies over a wide variety of operating conditions. Desirable electro-mechanical, or hydro-mechanical, transmissions should leverage the benefits of a series, hybrid transmission for desirable low-average power duty cycles—i.e.: low speed start/stop duty cycles—as well as the benefits of a parallel hybrid transmission for high-average output power, high speed duty cycles. In a parallel arrangement the power supplied by the engine and the power supplied by the supplemental source of energy—i.e.: motor/generators or hydrostatic power sources—are independently connected to the drive members. As such, the present invention is not to be confused with a parallel propulsion system. However, should further definition as to that type propulsion system be desired, a detailed explanation as to the structure and operation of variable, two-mode, input-split, parallel, hybrid electromechanical transmissions is set forth in pending U.S. patent application, Ser. No. 09/103,850, filed Jun. 24, 1998, which has been assigned to General Motors Corporation.

Moreover, perfecting a concept wherein two modes, or gear trains, are available for synchronous selection by the on-board computer to transmit power from the engine and/or the motor/generators in electro-mechanical transmissions—and from the engine and/or the hydrostatic power source in hydro-mechanical transmissions—to the output shaft results in a hybrid transmission having an extremely wide range of applications. Unfortunately, even such hybrid transmissions have heretofore provided very limited speeds and tractive effort in reverse.

The desired speeds and tractive effort at over-the-road cruising operation may be accomplished by the use of a variable, two-mode, input-split, parallel, hybrid electromechanical, or hydro-mechanical, transmission. Such transmissions utilize an input member to receive power from the vehicle engine and a power output member to deliver power to drive the vehicle.

In electro-mechanical variations first and second motor/generators are connected to energy storage devices, such as batteries, so that the energy storage devices can accept power from, and supply power to, the first and second motor/generators. A control unit regulates power flow among the energy storage devices and the motor/generators as well as between the first and second motor/generators. Such an arrangement is depicted in U.S. Pat. No. 5,558,589 issued on Sep. 24, 1996, to General Motors Corporation.

In hydro-mechanical variations hydrostatic devices are substituted for the motor/generators. The present invention is not dependent upon which variation is employed. That is, either electric motor/generator units or hydrostatic pump/motor units may be utilized in two-mode, compound-split, vehicular transmissions employing the concepts of the present invention so as to provide both enhanced speed and tractive effort—even while operating in reverse.

As will become apparent, the present invention is readily adaptable to the military market, the agricultural market or the commercial market.

It is well appreciated that input split transmissions cannot transmit high power in reverse. With commercial versions of input split transmissions—which typically do not deliver high tractive effort in reverse—an accommodation for this drawback has been achieved by supplementing the required input power with batteries while in reverse range. Where high tractive effort is required, or desired, in the reverse range input split transmissions are not generally acceptable. As will be hereinafter more fully described, two-mode, compound-split, vehicular transmissions can be adapted to incorporate the concepts of the present invention and thereby deliver considerably enhanced tractive effort in reverse—and over an enhanced range of speeds.

For the commercial market, one should design the transmission to provide the highest overall efficiency at vehicle cruise speed inasmuch as commercial trucks, for example, travel at such speeds during the vast majority of the time that they are operating.

To the contrary, vehicles intended for the agricultural market spend the vast majority of their operation at speeds falling within the range of from about five to about nine miles per hour. Thus, while agricultural tractors can be driven at over 20 miles per hour, such usage is not normally continuous over an extended period of time. In order to provide the desired tractive effort for the relatively low speeds at which agricultural tractors normally operate, transmissions for such vehicles have increased the engine speed to vehicle speed ratios so as to provide as many as twelve to sixteen speed shifts. However, such transmissions have largely been designed as two and three range, output split, hydro-mechanical transmissions with synchronous shifts. To date no input split or compound-split transmission has been provided for the agricultural market.

It must be recognized that most hydrostatic pump/motor units cannot readily be disposed concentrically about one or more planetary gear sets, and for that reason hydrostatic pump/motor units generally need to be located on their own centerlines that are laterally offset from the common centerline of the planetary gear sets employed in the transmission. To the contrary, electrical motor/generator units are well adapted to being concentrically disposed with respect to the planetary gear sets with which they are used. Except for this accommodation to the lateral disposition of the hydrostatic pump/motor units, the present invention utilizes a two mode, compound-split, arrangement that provides at least one mechanical point in the first range, or mode, and at least one, and (as disclosed) two mechanical points in the second range, or mode.

It should be noted that a mechanical point occurs when either of the supplemental power receiving/delivery units—i.e.: either electro-mechanical (such as motor/generator units) or hydro-mechanical (such as hydraulic pump/motors units)—is stationary at any time during operation of the transmission in either the first or second mode. The lack of a mechanical point is a drawback inasmuch as the maximum mechanical efficiency in the transfer of power from the engine to the output occurs when one of the supplemental power units is at a mechanical point—i.e.: is stationary. In variable, two-mode, input-split, parallel, hybrid electro-mechanical, or hydro-mechanical, transmissions, however, there is typically one point in the second mode at which one of the supplemental power units is not rotating such that all the engine power is transferred mechanically to the output. In the aforesaid U.S. Pat. No. 5,558,589 there are two mechanical points in the second mode as well as one mechanical point in the first mode.

By thus selecting the mechanical path within the transmission, the power and size of the supplemental power units can remain small and yet increase the overall efficiency of the transmission.

For the military market one designs the transmission to provide sixty percent maximum gradeability—i.e.: the inclination of the grade expressed as a percentage between horizontal (zero %) and vertical (100%) that a vehicle can climb without losing speed—versus the twenty-five percent gradeability desired for commercial vehicles. In addition, the top speed for a military transmission is customarily about 55 miles per hour versus about 65 miles per hour for its commercial counterpart. As such, the military version requires approximately twice the output corner horsepower of a commercial transmission for the same input power. Thus, for a 40,000 pound vehicle this would be a maximum tractive effort of 10,000 pounds for a commercial vehicle vis-a-vis 24,000 pounds for the military application.

However, the prior art does not teach or suggest any two-mode, compound-split, vehicular transmission configuration wherein the reverse range is much other than a redirection of the low speed, low tractive effort provided in the initial portion of the low speed, forward range.

SUMMARY OF THE INVENTION

It is, therefore, one primary aspect of the present invention to provide a novel, two-mode, compound-split, transmission incorporating supplemental power receiving/delivery units such that the transmission is capable of providing enhanced tractive effort over a wide range of speeds, even in the reverse range.

It is another primary aspect of the present invention to provide a novel, two-mode, compound-split, electro-mechanical, or hydro-mechanical, transmission that is capable of providing enhanced tractive effort over a wide range of speeds in the reverse range.

It is a further aspect of the present invention to provide novel transmissions, as above, wherein said operational results can be achieved with four planetary gear sub sets.

It is still another aspect of the present invention to provide a novel transmission, as above, by which the desired operational results can be achieved by compounding combinations of the four planetary gear sub sets, some permanently and some selectively.

It is yet another aspect of the present invention to provide novel transmissions, as above, wherein only three torque transfer devices are required to achieve the desired results for the transmission.

These and other aspects of the invention, as well as the advantages thereof over existing and prior art forms, which will be apparent in view of the following detailed specification, are accomplished by means hereinafter described and claimed.

By way of a general introductory description, a two-mode, compound-split, transmission embodying the concepts of the present invention utilizes an input member for receiving power from a prime mover power source and an output member for delivering power from the transmission.

The transmission incorporates four compounded planetary gear sub sets. A pair of supplemental power receiving/delivering units are also employed, as are three torque transfer devices.

In what is termed an electro-mechanical transmission, the supplemental power receiving/delivery units may be first and second electrical motor/generators. The motor/generators may be operatively connected to an energy storage means for interchanging electrical power between the storage means and the first and second motor/generators, and a control means is provided for regulating the electrical power interchange between the energy storage means and the first and second motor/generators. The control means also regulates electrical power interchange between the first and second motor/generators.

In what is termed a hydro-mechanical transmission, the supplemental power receiving/delivery units may be first and second hydraulic pump/motors, that receive power from, and hydraulic pump/motors, that deliver power to, selected gear members of selected planetary gear sub sets.

Two of the three torque transfer devices selectively ground selected members of the compounded planetary gear sub sets. The remaining torque transfer device selectively connects selected members of the compounded planetary gear sub sets to the output member.

Specifically, one of the three torque transfer devices is engaged to effect a first mode of forward operation by the transmission. Another of the torque transfer devices is engaged to effect a second mode of forward operation by the transmission, and the third of the torque transfer devices is engaged substantially to replicate the enhanced tractive effort and speeds typically available during forward operation in the first mode but in a reverse direction.

To acquaint persons skilled in the arts most closely related to the present invention, one embodiment of a two-mode, compound-split, electro-mechanical transmission and one variation thereof as well as one embodiment of a two-mode, compound-split, hydro-mechanical transmission, all of which illustrate representative structural arrangements now contemplated for putting the invention into practice are described herein by, and with reference to, the annexed drawings that form a part of the specification.

The exemplary two-mode, compound-split, electro-mechanical transmission (and the variation thereof) as well as an exemplary two-mode, compound-split, hydro-mechanical transmission are described in detail without attempting to show all of the various forms and modifications in which the invention might be embodied.

As such, the embodiments shown and described herein are only illustrative, and as will become apparent to those skilled in these arts can be modified in numerous ways within the spirit and scope of the invention; the invention being measured by the appended claims and not by the details of the specification.

DESCRIPTION OF THE PREFERRED EMBODIMENT

Figure 1:
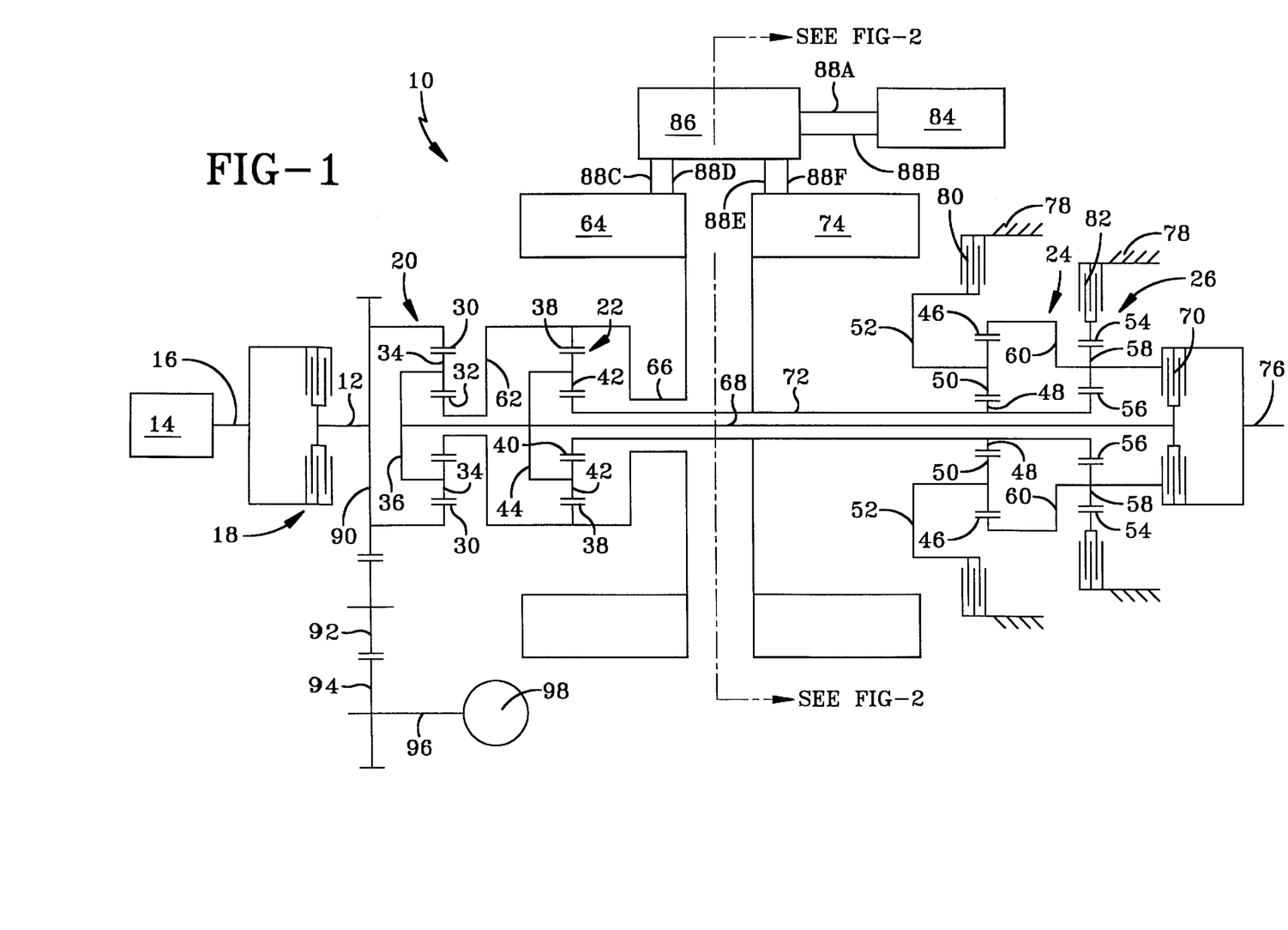
FIG. 1 is a schematic representation of one preferred form of a two-mode, compound-split, electro-mechanical transmission embodying the concepts of the p resent invention.

One representative form of a two-mode, compound-split, electro-mechanical transmission embodying the concepts of the present invention is designated generally by the numeral 10 on the accompanying drawings, and that preferred form of the transmission is depicted in FIG. 1. With particular reference, then, to that figure, the hybrid transmission 10 has an input member 12 that may be in the nature of a shaft which may be directly driven by a prime mover power source that may well be an engine 14, or, as is well known to the art, a transient torque damper, not shown, may be operatively interposed between the output shaft 16 of the engine 14 and the input member 12 of the hybrid transmission 10. An excellent example of a transient torque damper of the type recommended for the present usage is disclosed in detail in U.S. Pat. No. 5,009,301 which issued on Apr. 23, 1991, to General Motors Corporation.

The transient torque damper may incorporate, or be employed in conjunction with, a clutch 18 to permit selective engagement of the engine 14 with the hybrid transmission 10, but it must be understood that the clutch 18, though a type of torque transfer device, is not utilized to change, or control, the modes in which the hybrid transmission 10 operates.

In the embodiment depicted, the engine 14 may be a fossil fuel engine, such as a diesel engine which is readily adapted to provide its available power output delivered at a constant number of revolutions per minute (RPM). In the exemplary embodiment to which FIG. 1 is directed, and depending upon the desired output, the engine 14 can—after start-up, and during the majority of its output—operate at a constant speed in the range of from approximately 2100 RPM to approximately 2600 RPM. Although it must be understood that specific speeds and horsepower outputs of the engine 14 are not critical to the invention.

For the purpose of effecting an absolutely clear understanding of the hybrid transmission 10, an available output of from about 210 to about 300 horsepower from engine 14 will be assumed for the description of an exemplary installation. Irrespective of the means by which the engine 14 is connected to the input member 12 of the transmission 10, the input member 12 is connected to a first planetary gear sub-set 20 in the transmission 10.

The hybrid transmission 10 utilizes four planetary gear sub sets 20, 22, 24 and 26. The first planetary gear sub set 20 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear sub set 22 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear sub set 24 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

The fourth planetary gear sub set 26 also has an outer gear member 54, generally designated as the ring gear, which circumscribes an inner gear member 56, generally designated as the sun gear. A plurality of planet gear members 58 are rotatably mounted on a carrier 60 such that each planet gear 58 meshingly engages both the outer gear member 54 and the inner gear member 56.

While all four planetary gear sub sets 20, 22, 24 and 26 are "simple" planetary gear sub sets in their own right, various combinations of the aforesaid planetary gear sub sets are either permanently, or selectively, compounded.

Specifically, the first and second planetary gear sub sets 20 and 22 are compounded in that the inner gear member 32 of the first planetary gear sub set 20 is conjoined, as through an annular hub and radially extending connecting plate combination 62, to the outer gear member 38 of the second planetary gear sub set 22. It will be observed that the conjoined inner gear member 32 of the first planetary gear sub set 20 and the outer gear member 38 of the second planetary gear sub set 22 are continuously connected to a first motor/generator 64, as by an outer sleeve shaft 66.

The planetary gear sub sets 20 and 22 are further compounded in that the carrier 36 of the first planetary gear sub set 20 is conjoined, as through an axially disposed shaft 68, to the carrier 44 of the second planetary gear sub set 22. The shaft 68 is also selectively connected to the carrier 60 of the fourth planetary gear sub set 26, as through a first torque transfer device 70 which, as will be hereinafter more fully explained, is employed to assist in the selection of the operational modes of the hybrid transmission 10.

The inner gear member 40 of the second planetary gear sub set 22 is connected to the inner gear member 48 of the third planetary gear sub set 24, as through a sleeve shaft 72 that is disposed concentrically between the axial shaft 68 and the outer sleeve shaft 66. The inner gear 56 of the fourth planetary gear sub set 26 is also connected to the sleeve shaft 72 to effect compounding of the second, third and fourth planetary gear sub sets 22, 24 and 26, respectively.

The sleeve shaft 72 is also continuously connected to a second motor/generator 74, as by a radially disposed connecting plate 75.

The outer gear member 46 of the third planetary gear sub set 24 is permanently connected to the carrier 60 of the fourth planetary gear sub set as well as the output shaft member 76 of the transmission 10.

The carrier 52 of the third planetary gear sub-set 24 is selectively connected to ground, represented by the transmission housing 78, through a second torque transfer device 80. The torque transfer device 80, as is also hereinafter explained, is also employed to assist in the selection of the operational modes of the hybrid transmission 10.

The outer gear member 54 of the fourth planetary gear sub set 26 is selectively connected to ground 78 through a third torque transfer device 82.

When the hybrid transmission 10 is used in a land vehicle the output member 76 may be connected to the vehicular axles (not shown) that may, in turn, terminate in the drive members (also not shown). The drive members may be either front or rear wheels of the vehicle on which they are employed, or they may be the drive gear of a track vehicle.

It should be observed that all four planetary gear sub sets 20, 22, 24 and 26 as well as the two motor/generators 64 and 74 may be coaxially oriented, as about the axially disposed shaft 68. It should be noted that both motor/generators 64 and 74 are of an annular configuration which permits them to circumscribe the four planetary gear sub sets 20, 22, 24 and 26 such that the aforesaid planetary gear sub sets are disposed radially inwardly of the motor/generators 64 and 74. This configuration assures that the overall envelope—i.e.: the dimensions that delineate the outer circumference of the transmission 10—may be minimized.

Figure 2:
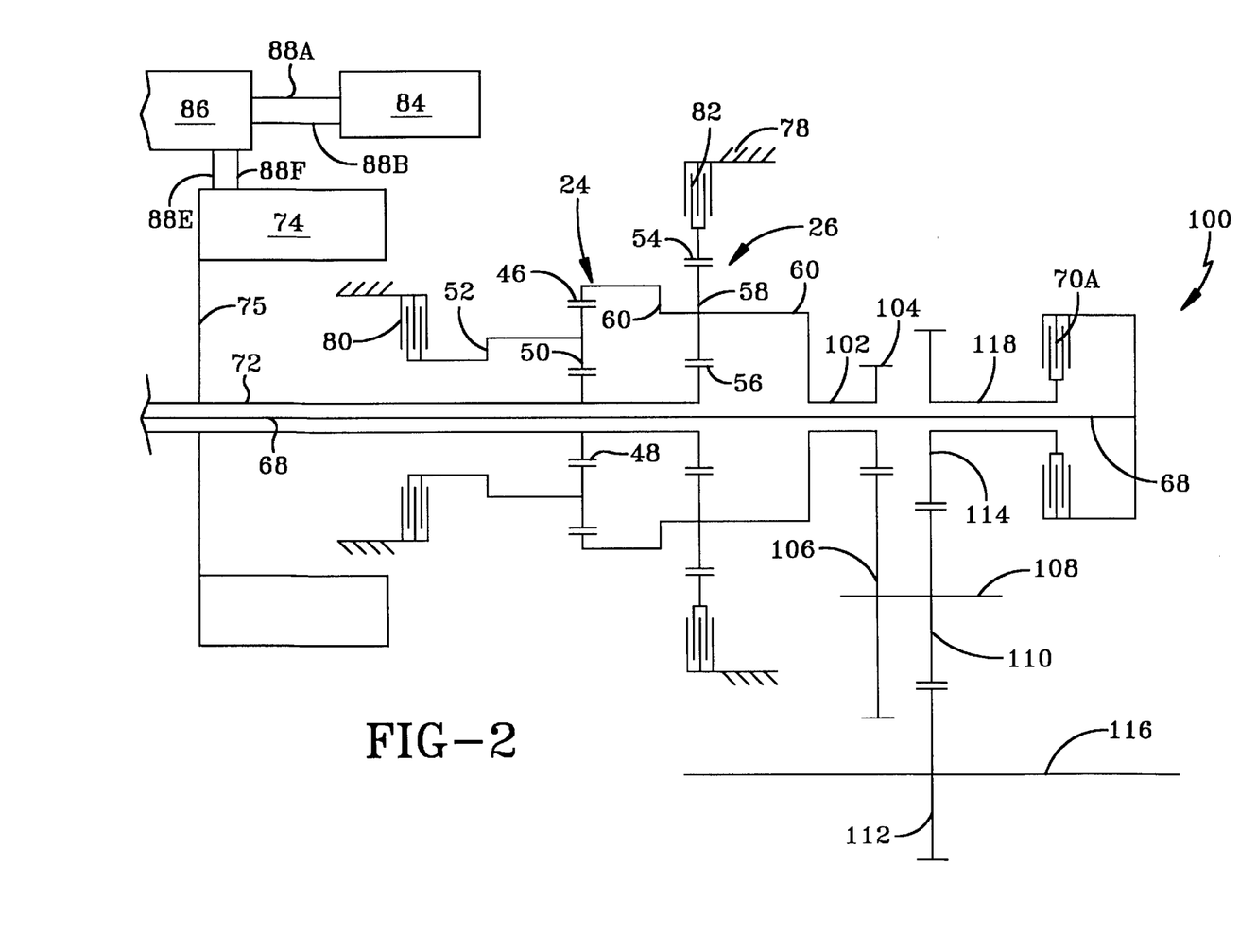
FIG. 2 is a schematic representation of a variation to the transmission depicted in FIG. 1 wherein the variation comprises a replacement of that structure depicted to the right of the vertical chain-line appearing on FIG. 1 and designated "SEE FIG. 2"—FIG. 2 thus being directed to a drop box output that is particularly desired for many military applications as well as for four wheel drive vehicles, and as such the drop box has been substituted for the output shaft member depicted in FIG. 1.

As was previously herein explained in conjunction with the description of the engine 14, it must similarly be understood that the rotational speed and horsepower output of the first and second motor/generators 64 and 74 are also not per se critical to the invention, but for the purpose of effecting an absolutely clear understanding of the hybrid transmission 10 a maximum speed of from about 5950 RPM to about 6200 RPM for motor/generators having a continuous rating of from about 105 to about 170 horsepower (700 to 850 foot-pounds, respectively, at stall) will be assumed for description of the exemplary arrangements depicted in FIGS. 1 and 2.

As should be apparent from the foregoing description, the transmission 10 selectively receives power from the engine 14. As will now be explained, the hybrid transmission 10 also receives power from an electric storage device 84. The electric storage device 84 may be one or more batteries. Other electric devices that have the ability to store (or even generate electrical power, such as fuel cells) electric power and dispense electric power may be used in place of the batteries without altering the concepts of the present invention. As was explained in conjunction with the description of the engine 14 and the motor/generators 64 and 74, it must similarly be understood that the horsepower output of the electrical storage device 84 is also not critical to the invention, but for the purpose of effecting an absolutely clear understanding of the hybrid transmission 10 an output of about thirty horsepower from the electrical storage device 84 will be assumed for description of an exemplary device.

The electric storage device 84 communicates with an electrical control unit (ECU) 86 by transfer conductors 88A and 88B. The ECU 86 communicates with the first motor/generator 64 by transfer conductors 88C and 88D, and the ECU 86 similarly communicates with the second motor/generator 74 by transfer conductors 88E and 88F.

As apparent from the previous paragraph, a particular structural member, component or arrangement may be employed at more than one location. When referring generally to that type of structural member, component or arrangement, a common numerical designation will be employed. However, when one of the structural members, components or arrangements so identified is to be individually identified, it will be referenced by virtue of a letter suffix employed in combination with the numerical designation employed for general identification of that structural member, component or arrangement. Thus, there are at least six transfer conductors which are generally identified by the numeral 88, but the specific, individual transfer conductors are, therefore, identified as 88A, 88B, 88C, 88D, 88E and 88F in the specification and on the drawings. This same suffix convention shall be employed throughout the specification.

A drive gear 90 may be presented from the input member 12. As depicted, the drive gear 90 fixedly connects the input member 12 to the outer gear member 30 of the first planetary gear sub-set 20, and the drive gear 90, therefore, receives power from the engine 14. The drive gear 90 meshingly engages an idler gear 92 which, in turn, meshingly engages a transfer gear 94 that is secured to one end of a shaft 96. The other end of the shaft 96 may be secured to a transmission fluid pump and/or power take-off unit (PTO), designated either individually or collectively at 98.

First Variation of the Exemplary Embodiment

With specific reference to FIG. 2 one can observe that only the structural details to the right of the vertical chain-line in FIG. 1 are different from the embodiment depicted in FIG. 1. Primarily, the output shaft 76 from the transmission 10 depicted in FIG. 1 has been replaced by an optional drop box, designated generally by the numeral 100, which permits output from the transmission to be displaced laterally and/or vertically from the axially disposed output shaft 76 utilized in the configuration depicted in FIG. 1.

Whereas the carrier 60 is shown as being directly, and continuously, connected to the output shaft 76 in FIG. 1, in the variation depicted in FIG. 2 the carrier 60 is connected directly, and continuously, to an annular, rotatable collar 102 that presents a radially disposed drive gear 104. The drive gear 104, in turn, meshingly engages a first transfer gear 106 that is continuously secured to rotate with an idler shaft 108. A second transfer gear 110 is also continuously secured to rotate with the idler shaft 108.

The second transfer gear 110 meshingly engages both an output gear 112 and a drive gear 114. The output gear 112 is secured to, and drives, an output shaft member 116 either end of which may be operatively connected to the drive wheels, or track, of the vehicle. As such, rotation imparted to the first transfer gear 106 effects rotation of not only the second transfer gear 110 and the output gear 112 but also the output shaft 116.

The radially disposed drive gear 114 is presented from a second, annular rotatable collar 118. The second, annular, rotatable collar 118 is selectively connected to the shaft 68, through a torque transfer device 70A.

Operation of the Exemplary Preferred Embodiments Introduction

The exemplary embodiment depicted in FIG. 1, as well as the variation thereof depicted in FIG. 2, operate in virtually identical manners. However, because the first variation exemplifies the configuration that would be used by a heavy vehicle weighing, for example, on the order of five tons, an understanding as to the operation thereof will emphasize the benefits derived from the present invention. To operate a vehicle incorporating a transmission embodying the concepts of the present invention, the operator of the vehicle has three, well-known, primary devices to control the transmission 10. One of the primary control devices is a well known drive range selector (not shown) that directs the ECU 86 to configure the transmission for either the park, reverse, neutral, or forward drive range. The second and third primary control devices constitute an accelerator pedal (not shown) and a brake pedal (also not shown). The information obtained by the ECU 86 from these three primary control sources will hereinafter be referred to as the "operator demand." The ECU 86 also obtains information from both the first and second motor/generator units 64 and 74, respectively, the engine 14 and the electric storage device 84. In response to an operator's action, the ECU 86 determines what is required and then manipulates the selectively operated components of the hybrid transmission 10 appropriately to respond to the operator demand.

For example, when the operator has selected a forward drive range and manipulates either the accelerator pedal or the brake pedal, the ECU 86 determines if the vehicle should accelerate or decelerate. The ECU 86 also monitors the state of the power sources, and determines the output of the transmission required to effect the desired rate of acceleration or deceleration. Under the direction of the ECU 86 the transmission is capable of providing a range of output speeds from slow to fast in order to meet the operator demand.

In order to provide a fall explanation as to the operation of a transmission embodying the concepts of the present invention, a description of the operational modes employed to achieve the output power and speeds necessary to meet the operator demand under various operating conditions will be hereinafter provided with respect to the first variation of the preferred embodiment. As such, the following description describes the full power operational states of the particular transmission identified by the numeral 10 in FIG. 1—an alternative configuration for a portion of which is detailed in FIG. 2.

Once the overall concept as to how the preferred embodiments depicted in FIGS. 1 and 2 operate are understood, it will be further recognized that those same concepts likewise apply to the operation not only of the primary embodiments but also to the operation of the alternative embodiment thereof which are described herein.

To reiterate, the transmission 10 may be a two-mode, compound-split, electro-mechanical, vehicular transmission, as depicted in its entirety in FIG. 1 and which may well be employed in conjunction with a drop box output 100, as depicted in FIG. 2. In other words, the output shaft 76 (FIG. 1) or output shaft 116 (FIG. 2) receives power through two distinct gear trains within the transmission 10.

A first mode, or gear train, is selected in either embodiment when the torque transfer device 82 is actuated in order to "ground" the outer gear member 54 of the fourth planetary gear sub-set 26.

Likewise, a second mode, or gear train, is selected in either embodiment when the torque transfer device 82 is released and the torque transfer device 70 (FIG. 1) or torque transfer device 70A (FIG. 2) is simultaneously actuated to connect the shaft 68 to the carrier 60 of the fourth planetary gear sub-set 26.

In the embodiment depicted in FIG. 1 the connection between the shaft 68 and the carrier 60 is directly effected when torque transfer device 70 is actuated. However, in the variation depicted in FIG. 2 the same connection is effected, but indirectly. To elaborate, when torque transfer device 70A is actuated, the shaft 68 is directly connected to the annular collar 118 that is permanently connected to drive gear 114 to rotate idler shaft 108 that, in turn, rotates the output shaft 116 though the output gear 112.

Those skilled in the art will appreciate that the ECU 86 serves to provide a range of output speeds from relatively slow to relatively fast within each mode of operation. This combination of two modes with a slow to fast output speed range in each mode allows the transmission 10 to propel a vehicle from a stationary condition to highway speeds while satisfying the other objects of the invention. Additionally, the ECU 86 coordinates operation of the transmission 10 so as to allow synchronized shifts between the modes.

As noted, operation of the first variation of the preferred embodiment will be described as it relates to full power operation inasmuch as that approach will fully describe the general operational concepts.

First Mode

With reference, then, to either FIG. 1 or FIG. 2, In the first mode of operation, and when the ECU 86 has determined that the operator desires to move forwardly from a stationary condition, and to accelerate in the first mode (low forward), the torque transfer device 82 is engaged operatively to drive the output shaft member 76 (FIG. 1) or the output shaft member 116 (FIG. 2). The torque transfer device 82 remains applied as the vehicle moves forwardly through the first mode speed range, as hereinafter more fully described. The torque transfer devices 70 (or 70A) and 80, however, remain disengaged. In this situation the engine 14 applies driving power to the outer gear member 30 of the first planetary gear sub set 20 so the outer member 30 rotates in unison with the input member 12 (and thus the engine 14). The first motor/generator unit 64, operating as a generator, is rotated by the inner gear member 32 of the first planetary gear sub set 20 and the outer gear member 38 of the second planetary gear sub set 22 that rotate in the same direction, thus driving the carrier 36 in the same direction—which effects rotation of the shaft 68, and therefore the carrier 44, in the same direction. The inner gear member 48 of the third planetary gear sub set 24 as well as the inner gear member 56 of the fourth planetary gear sub set 26 will rotate in the same direction as the sleeve shaft 72, and the sleeve shaft 72 is rotated by the second motor/generator unit 74, operating as a motor, through that portion of the first mode prior to the time that the vehicle reaches almost 14 MPH.

Figure 3:
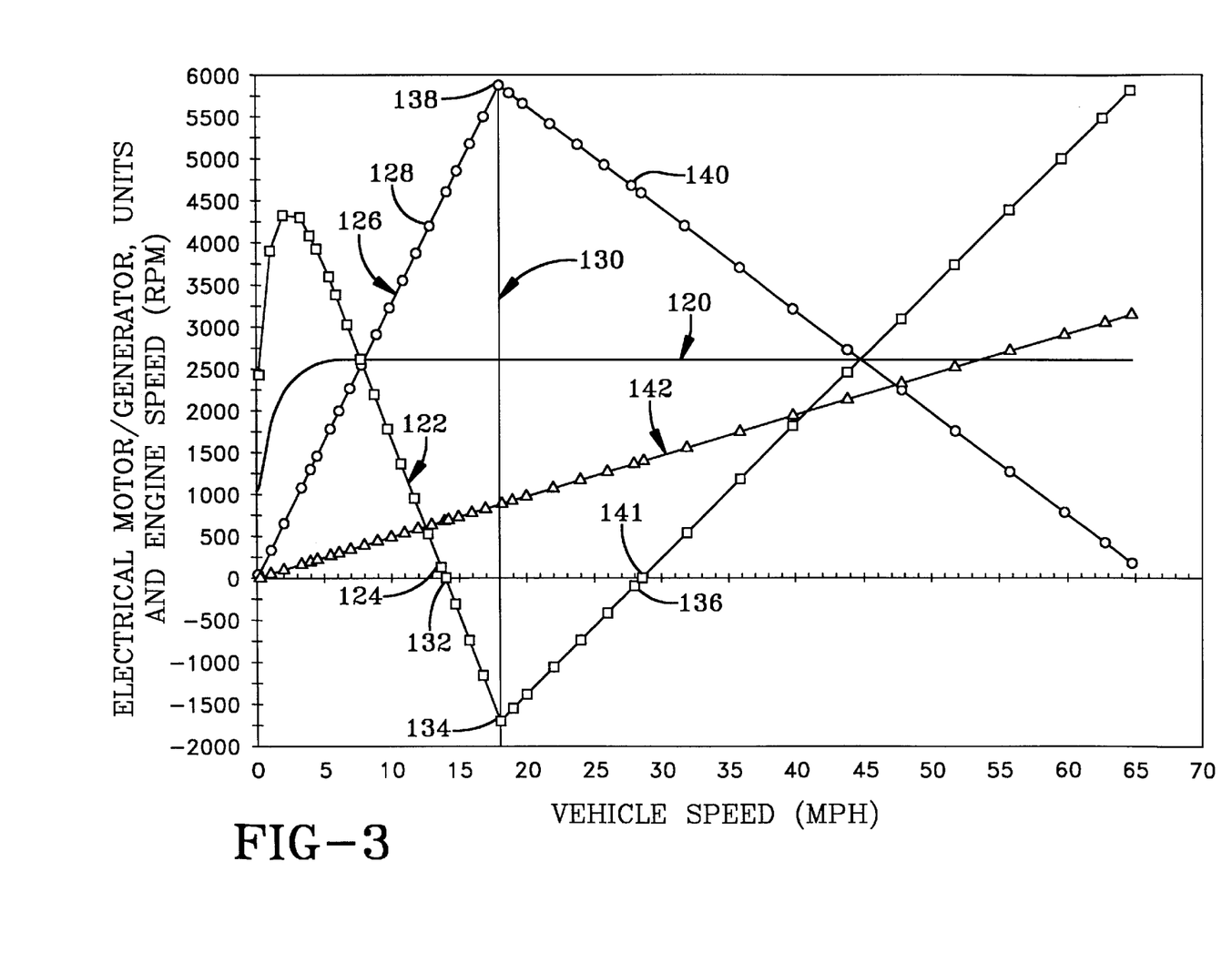
FIG. 3 is a graphical depiction of the rotations per minute (RPM) of each motor/generator as well as the engine relative to the speed of the vehicle in miles per hour (MPH) that is representative of the results which can be achieved by transmissions embodying the concepts of the present invention, and particularly such a transmission as that depicted in FIG. 2.

An understanding of the operational results of the first and second motor/generator units 64 and 74 is facilitated by reference to the plotted curves set forth on FIG. 3. The hereinafter described plottings appearing on FIG. 3 resulted from using a 300 horsepower engine 14 capable of sustained operation at 2600 RPM. Each motor/generator unit 64 and 74 was rated at 170 horsepower at continuous output operating up to a maximum of 6200 RPM with an 850 foot-pound stall. As such, and with reference to FIG. 3, curve 120 is the plot of the engine speed in revolutions per minute (RPM) against the speed in miles per hour (MPH) of the vehicle in which the engine 14 and hybrid transmission 10 are incorporated. For convenience it will be noted that curve 120 is represented as an uninterrupted, solid line to provide rapid visual identification.

Curve 122 is the plot of the rotational speed (RPM) of the first motor/generator unit 64, also relative to the speed (MPH) of the vehicle. Curve 122 may be readily distinguished by the fact that the plot points appear as small squares. From the initial, forward movement of the vehicle to a forward, vehicular speed of about 13.9 MPH the first motor/generator unit 64 operates as a generator, but at that speed the operation of the first motor/generator unit 64 changes to that of a motor and remains operating as motor throughout the remainder of the first mode. Plot point 124 on curve 122 designates the transitional point at which the operation of the first motor/generator unit 64 changes from that of a generator to that of a motor.

Curve 126 is the plot of the rotational speed (RPM) of the second motor/generator unit 74 relative to the speed (MPH) of the vehicle. Curve 126 may be readily distinguished by the fact that the plot points appear as small o's. From the initial, forward movement of the vehicle to a forward, vehicular speed of about 13.9 MPH the second motor/generator unit 74 operates as a motor, but at that speed the operation of the second motor/generator unit 74 changes to that of a generator and remains operating as generator throughout the remainder of the first mode. Plot point 128 on curve 126 designates the transitional point at which the operation of the second motor/generator unit 74 changes from that of a motor to that of a generator.

The first operational mode of transmission 10 extends from the abscissa, which designates engine speed (RPM), to line 130 which is drawn parallel to the abscissa and which defines the shift from operation of the transmission 10 in the first mode to the second mode. In the representative embodiment described, the first mode extends from the vehicle at rest to a forward speed on the order of about 18.24 MPH. At speeds greater than about 18.24 MPH the transmission operates in the second mode.

As such, the first motor/generator unit 64 operates initially as a generator and within the first mode changes its operation to that of a motor. Conversely, the second motor/generator units 74 operates initially as a motor but within the first mode changes to operate as a generator. The aforesaid transitions in the operation of the first and second motor/generator units 64 and 74 are the result of the number of teeth on the various gear members within the compounded planetary gear sub sets which cause the speeds of the two motor/generator units to reverse at various operational speeds of the vehicle.

Should one wish to duplicate the results described herein, the outer gear members 30 and 38 in each of the first and second planetary gear sub sets 20 and 22, respectively, have 115 teeth, and the inner gear members 32 and 40 in each of the first and second planetary gear sub sets 20 and 22 have 65 teeth. The outer gear member 54 of the fourth planetary gear sub set 26 has 26 teeth, and the inner gear member 56 of the fourth planetary gear sub set 26 has 62 teeth. This completes the designation as to the number of teeth provided on the various gear members in the planetary gear sub sets incorporated in the embodiment depicted in FIG. 1 as well as for the identical components incorporated in that variation of the transmission to which FIG. 2 is directed. However, to complete the gear teeth information as to FIG. 2 it should be noted that the gear members in the drop gear box incorporate the following number of teeth: The drive gear 104 presented from the first collar 102 has 38 teeth; The first transfer gear 106 has 53 teeth; The second transfer gear 110 has 37 teeth; The output gear 112 has 66 teeth; and The drive gear 114 presented from the second collar 118 has 54 teeth.

With the configuration of the transmission 10 heretofore described, and with the aforesaid number of teeth on the inner and outer gear members, the transmission provides a mechanical point while operating in the first mode. That is, the first motor/generator 64 has a zero rotational speed at about 13.9 MPH, as depicted by plot point 132 on curve 122.

To complete the description as to the operation of the motor/generator units in the exemplary environment described, one must consider operation of the transmission in the second mode as well as in the reverse modes of operation.

Second Mode

The transition from the first to the second mode of operation is achieved by disengaging torque transfer device 82 and simultaneously applying torque transfer device 70 for the embodiment depicted in FIG. 1 (or the torque transfer device 70A for the embodiment depicted in FIG. 2). During the shift from the first to the second mode of operation the first motor/generator unit 64 transitions once again, but this time from operating as a motor to operating as a generator. Inasmuch as the transition from operation of the transmission 10 in the first mode to operation in the second mode occurs at line 130 (FIG. 3), the transition of the first motor/generator unit 64 from a motor to a generator occurs at point 134 on curve 122—which also delineates the intersection of the curve 122 with line 130. The first motor/generator unit 64 continues to operate as a generator during the operation of the transmission 10 in the second mode while the vehicle gains speed from about 13.94 MPH to about 28.03 MPH. At about 28.03 MPH the first motor/generator unit 64 transitions from operation as a generator back to operation as a motor. This transition is represented as point 136 on curve 122. The first motor/generator unit 74 continues thereafter to operate as a motor.

During the shift from the first to the second mode of operation the second motor/generator unit 74 transitions from operating as a generator to operating as a motor. Inasmuch as the transition from operation of the transmission 10 in the first mode to operation in the second mode occurs at line 130, the transition of the second motor/generator unit 74 from a generator to a motor occurs at point 138 on curve 126—which also delineates the intersection of the curve 126 with line 130. In fact, the second motor/generator unit 74 operates as a motor until the vehicle reaches a speed of about 28.03 MPH, as represented by plot point 140 on curve 126. The second motor/generator unit 74 continues thereafter to operate as a generator.

With the configuration of the transmission 10 heretofore described, and with the aforesaid number of teeth on the inner and outer gear members, the transmission 10 also provides a mechanical point while operating in the second mode. That is, the first motor/generator unit 64 also has a zero rotational speed at about 28.7492 MPH, as designated by point 141 on curve 122, which point is fairly adjacent to the location where the first motor/generator unit 64 makes its final transition from a generator to a motor.

It should be understood that the exact location of the aforesaid mechanical points in both the first and second mode are determined not only by the number of teeth on the inner and outer gear members of the planetary gear sub sets, but also by the rotational speed of the input shaft 12. Hence, with the number of teeth disclosed for the inner and outer gear members in the first of the exemplary embodiments, and the first variation thereof, heretofore described, an increase in the speed of the input shaft 12 will shift the locations of the mechanical points to higher vehicular speeds, and conversely, a reduction in the speed of the input member 12 will shift the mechanical points to lower vehicular speeds.

Before describing operation in the reverse mode it should be noted that the rotational speed of the output shaft 116 of the drop box 100 with which the transmission 10 is operatively connected is also plotted on FIG. 3 as curve 142.

Reverse Mode

Operation in the reverse mode is virtually a replication of operation in the first mode but in the opposite direction. This unique result is occasioned by solely engaging torque transfer device 80. That is, by grounding the carrier 52 of the third planetary gear sub set 24 while assuring that the other two torque transfer devices 70 (or 70A) and 82 remain disengaged. As such, rotation of the inner gear member 48 in the third planetary gear sub set 24 against the planet gears 50 secured to a grounded carrier 52 drives the outer member 46 in a direction opposite to that of the driving inner gear member 48 which rotates the output member 76 in a direction opposite to that in which it rotates while driving the vehicle forwardly. Hence, the vehicle moves in reverse while affording a considerably greater tractive effort than provided by prior art transmissions.

Figure 4:
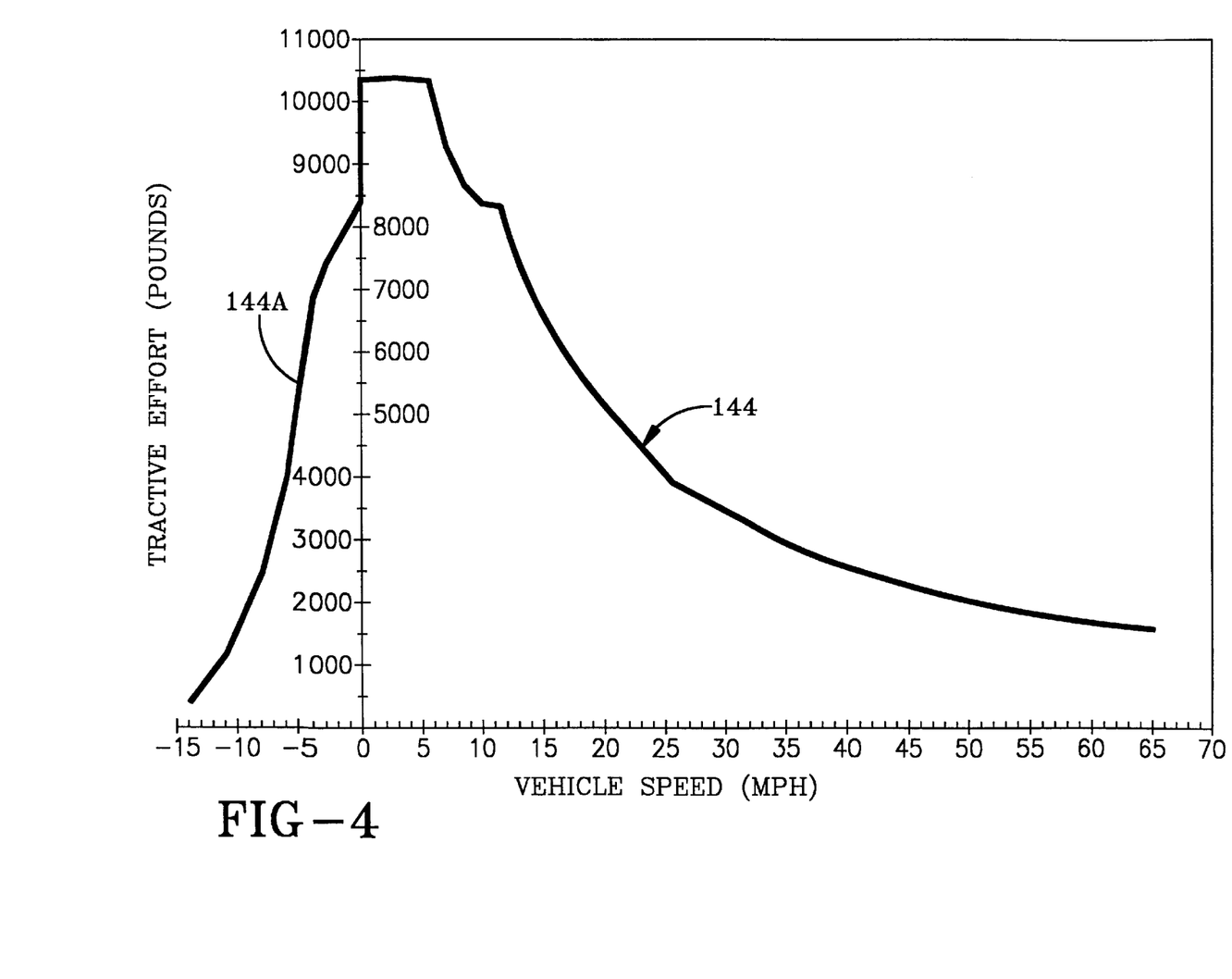
FIG. 4 is a graphical representation of the tractive effort afforded by a representative two-mode, compound-split, electro-mechanical transmission such as that represented in FIG. 1 visually to display the significant tractive effort provided in reverse, even when batteries are not employed.

In that regard attention is directed to FIG. 4 where the plotted curve 144 depicts the tractive effort provided by the transmission 10 from zero MPH to about 65 MPH in forward operation. The plotted curve 144A similarly depicts the tractive effort provided by the transmission 10 from zero MPH to about 14 MPH in reverse. In order to provide a true representation as to the tractive effort delivered by virtue of the transmission 10 from a 300 horsepower engine running at a constant speed of about 2400 RPM, those curves (both 144 and 144A) represent operation without the use of any power delivered by the batteries. That is, the power supplied by the transmission 10 was predicated solely by the power delivered to the transmission 10 both directly and indirectly from the engine 14.

Description of an Alternative Embodiment

Figure 5:
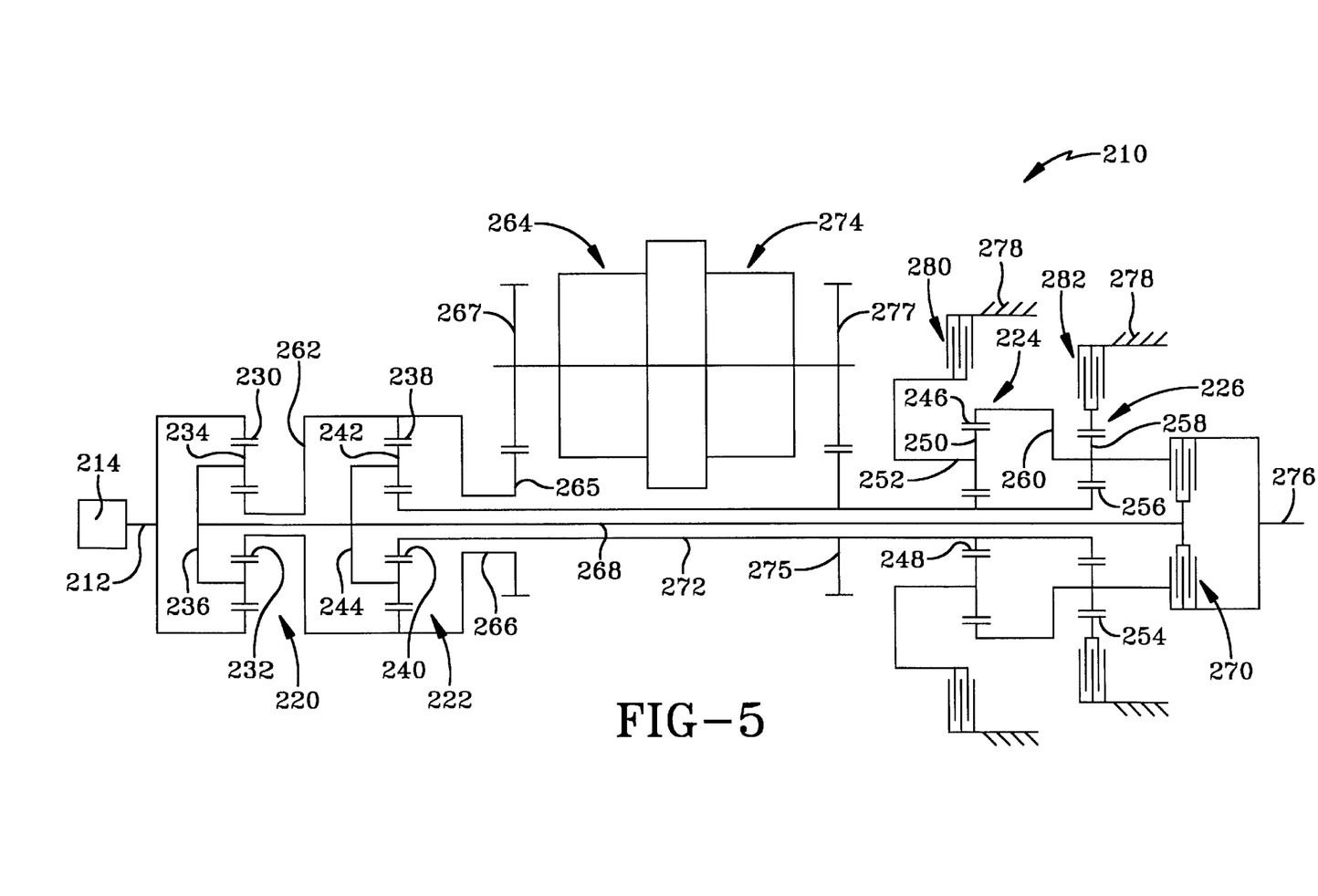
FIG. 5 is a schematic representation of one preferred form of a two-mode, compound-split, hydro-mechanical transmission embodying the concepts of the present invention.

A preferred alternative embodiment of the present invention is depicted in FIG. 5. The preferred alternative embodiment is in the nature of a two-mode, compound-split, hydro-mechanical transmission that is designated generally by the numeral 210 in FIG. 5. With particular reference, then, to that figure, the hybrid transmission 210 has an input member 212 that may be in the nature of a shaft which may be directly driven by a prime mover power source that may well be an engine 214.

The engine 214 may also be a fossil fuel engine, such as a diesel engine which is readily adapted to provide its available power output delivered at a constant number of revolutions per minute (RPM). In the alternative embodiment to which FIG. 5 is directed, and depending upon the desired output, the engine 214 can—after start-up, and during the majority of its output—operate at a constant speed of, for example, 2400 RPM. Although it must be understood that specific speeds and horsepower outputs of the engine 214 are not critical to the invention.

However, for the purpose of effecting an absolutely clear understanding of the hybrid transmission 210, an available output of about 280 horsepower from engine 214 will be assumed for the description of an exemplary installation. Irrespective of the means by which the engine 214 is connected to the input shaft member 212 of the transmission 210, the input shaft member 212 is connected to a first planetary gear sub set 220 in the transmission 210.

The hybrid transmission 210 utilizes four planetary gear sub sets 220, 222, 224 and 226. The first planetary gear sub set 220 has an outer gear member 230, that may generally be designated as the ring gear, which circumscribes an inner gear member 232, generally designated as the sun gear. A plurality of planet gear members 234 are rotatably mounted on a carrier 236 such that each planet gear member 234 meshingly engages both the outer gear member 230 and the inner gear member 232.

The second planetary gear sub set 222 also has an outer gear member 238, generally designated as the ring gear, which circumscribes an inner gear member 240, generally designated as the sun gear. A plurality of planet gear members 242 are rotatably mounted on a carrier 244 such that each planet gear 242 meshingly engages both the outer gear member 238 and the inner gear member 240.

The third planetary gear sub set 224 also has an outer gear member 246, generally designated as the ring gear, which circumscribes an inner gear member 248, generally designated as the sun gear. A plurality of planet gear members 250 are rotatably mounted on a carrier 252 such that each planet gear 250 meshingly engages both the outer gear member 246 and the inner gear member 248.

The fourth planetary gear sub set 226 also has an outer gear member 254, generally designated as the ring gear, which circumscribes an inner gear member 256, generally designated as the sun gear. A plurality of planet gear members 258 are rotatably mounted on a carrier 260 such that each planet gear 258 meshingly engages both the outer gear member 254 and the inner gear member 256.

While all four planetary gear sub sets 220, 222, 224 and 226 are "simple" planetary gear sub sets in their own right, various combinations of the aforesaid planetary gear sub sets are either permanently, or selectively, compounded.

Specifically, the first and second planetary gear sub sets 220 and 222 are compounded in that the inner gear member 232 of the first planetary gear sub set 220 is conjoined, as through an annular hub and radially extending connecting plate combination 262, to the outer gear member 238 of the second planetary gear sub set 222. It will be observed that the conjoined inner gear member 232 of the first planetary gear sub set 220 and the outer gear member 238 of the second planetary gear sub set 222 are continuously connected to a first hydrostatic pump/motor unit 264, as by an outer sleeve shaft 266 that presents a radially extending transfer gear 265 that meshingly engages an operating gear 267 operatively connected to the first hydrostatic pump/motor unit 264.

The planetary gear sub sets 220 and 222 are further compounded in that the carrier 236 of the first planetary gear sub set 220 is conjoined, as through a shaft 268, to the carrier 244 of the second planetary gear sub set 222. The shaft 268 is also selectively connected to the carrier 260 of the fourth planetary gear sub set 226, as through a first torque transfer device 270 which, as will be hereinafter more fully explained, is employed to assist in the selection of the operational modes of the hybrid transmission 210.

The inner gear member 240 of the second planetary gear sub set 222 is connected to the inner gear member 248 of the third planetary gear sub set 224, as through a sleeve shaft 272 that circumscribes shaft 268 and is, therefore, disposed between the outer sleeve 266 and the axial shaft 268. The inner gear 256 of the fourth planetary gear sub set 226 is also connected to the sleeve shaft 272 to effect compounding of the second, third and fourth planetary gear sub sets 222, 224 and 226, respectively.

The sleeve shaft 272 is also continuously connected to a second hydrostatic pump/motor unit 274, as by a transfer gear 275 that extends radially outwardly from the sleeve shaft 272 meshingly to engage an operating gear 277 operatively connected to the second hydrostatic pump/motor unit 274.

The outer gear member 246 of the third planetary gear sub set 224 is permanently connected to the carrier 260 of the fourth planetary gear sub set 226 as well as the output shaft member 276 of the transmission 210.

The carrier 252 of the third planetary gear sub set 224 is selectively connected to ground, represented by the transmission housing 278, through a second torque transfer device 280. The torque transfer device 280, as is also hereinafter explained, is also employed to assist in the selection of the operational modes of the hybrid transmission 210.

The outer gear member 254 of the fourth planetary gear sub set 226 is selectively connected to ground 278 through a third torque transfer device 282.

When the hybrid transmission 210 is used in a land vehicle the output shaft member 276 may be connected to the vehicular axles (not shown) that may, in turn, terminate in the drive members (also not shown). The drive members may be either front or rear wheels of the vehicle on which they are employed, or they may be the drive gear of a track vehicle.

It should be observed that all four planetary gear sub sets 220, 222, 224 and 226 may be coaxial about the axially disposed shaft 268, but the two hydrostatic pump/motor units 264 and 274 are laterally offset from the axis of the shaft 268 as well as the common axis of the four planetary gear sub sets 220, 222, 224 and 226.

As was previously herein explained in conjunction with the description of the engine 214, it must similarly be understood that the rotational speed and horsepower output of the first and second hydrostatic pump/motor units 264 and 274 are also not per se critical to the invention, but for the purpose of effecting an absolutely clear understanding of the hybrid transmission 210 a maximum speed of about 5400 RPM for the hydrostatic pump/motor units 264 and 274 having a maximum rating of about 920 foot-pounds at stall will be assumed for description of the exemplary arrangement depicted in FIG. 5.

As should be apparent from the foregoing description, the transmission 210 receives power directly from the engine 214, and the hydrostatic motor/pump units receive power indirectly from the engine 214.

Operation of the Alternative Embodiment

To operate a vehicle incorporating a transmission embodying the concepts of the present invention, the operator of the vehicle has three, well-known, primary devices to control the transmission 210. One of the primary control devices is a well known drive range selector (not shown) that directs an ECU (not shown) to configure the transmission for either the park, reverse, neutral, or forward drive range. The second and third primary control devices constitute an accelerator pedal (not shown) and a brake pedal (also not shown). The information obtained by the ECU from these three primary control sources will hereinafter be referred to as the "operator demand." The ECU also obtains information from both the first and second hydrostatic pump/motor units 264 and 274, respectively, and the engine 214. In response to an operator's action, the ECU determines what is required and then manipulates the selectively operated components of the hybrid transmission 210 appropriately to respond to the operator demand.

For example, when the operator has selected a forward drive range and manipulates either the accelerator pedal or the brake pedal, the ECU determines if the vehicle should accelerate or decelerate and determines the output of the transmission required to effect the desired rate of acceleration or deceleration. Under the direction of the ECU the transmission is capable of providing a range of output speeds from slow to fast in order to meet the operator demand.

In order to provide a full explanation as to the operation of a transmission 210 embodying the concepts of the present invention, a description of the operational modes employed to achieve the output power and speeds necessary to meet the operator demand under various operating conditions will now be provided. As such, the following description describes the full power operational states of the particular transmission identified by the numeral 210 in FIG. 5.

Once the overall concept as to how the alternative embodiment depicted in FIG. 5 operates is understood, it will be apparent that it operates quite similarly to those variations thereof which are described herein.

To reiterate, the transmission 210 may be a two-mode, compound-split, hydro-mechanical, vehicular transmission, as depicted in its entirety in FIG. 5 and which may well be employed in conjunction with a drop box output such as that depicted and described in conjunction with FIG. 2. As shown, the output shaft 276 receives power through two distinct gear trains within the transmission 210.

A first mode, or gear train, is selected when the torque transfer device 282 is actuated in order to "ground" the outer gear member 254 of the fourth planetary gear sub set 226.

Likewise, a second mode, or gear train, is selected when the torque transfer device 282 is released and the torque transfer device 270 is simultaneously actuated to connect the shaft 268 to the carrier 260 of the fourth planetary gear sub set 226.

As was the situation with the embodiment depicted in FIG. 1, the connection between the shaft 268 and the carrier 260 is directly effected when torque transfer device 270 is actuated.

Those skilled in the art will appreciate that the ECU serves to provide a range of output speeds from relatively slow to relatively fast within each mode of operation. This combination of two modes with a slow to fast output speed range in each mode allows the transmission 210 to propel a vehicle from a stationary condition to highway speeds while satisfying the other objects of the invention. Additionally, the ECU coordinates operation of the transmission 210 so as to allow synchronized shifts between the modes.

As noted, operation of the alternative transmission 210 depicted in FIG. 5 will be described as it relates to full power operation inasmuch as that approach will fully describe the general operational concepts.

First Mode

With continued reference, then, to FIG. 5, in the first mode of operation, and when the ECU has determined that the operator desires to move forwardly from a stationary condition, and to accelerate in the first mode (low forward), the torque transfer device 282 is engaged operatively to drive the output shaft member 276. The torque transfer device 282 remains applied as the vehicle moves forwardly through the first mode speed range, as hereinafter more fully described. The torque transfer devices 270 and 280, however, remain disengaged. In this situation the engine 214 applies driving power to the outer gear member 230 of the first planetary gear sub set 220 so the outer member 230 rotates in unison with the input member 212 (and thus the engine 214). The first hydrostatic pump/motor unit 264, operating as an hydraulic pump is rotated by the inner gear member 232 of the first planetary gear sub set 220 and the outer gear member 238 of the second planetary gear sub set 222 that rotate in the same direction, thus driving the carrier 236 in the same direction—which effects rotation of the shaft 268, and therefore the carrier 244, in the same direction. The inner gear member 240 of the third planetary gear sub set 224 as well as the inner gear member 256 of the fourth planetary gear sub set 226 will rotate in the same direction as the sleeve shaft 272, and the sleeve shaft 272 is rotated by the second hydrostatic pump/motor unit 274, operating as an hydraulic motor, through that portion of the first mode prior to the time that the vehicle reaches almost 22 MPH.

Figure 6:
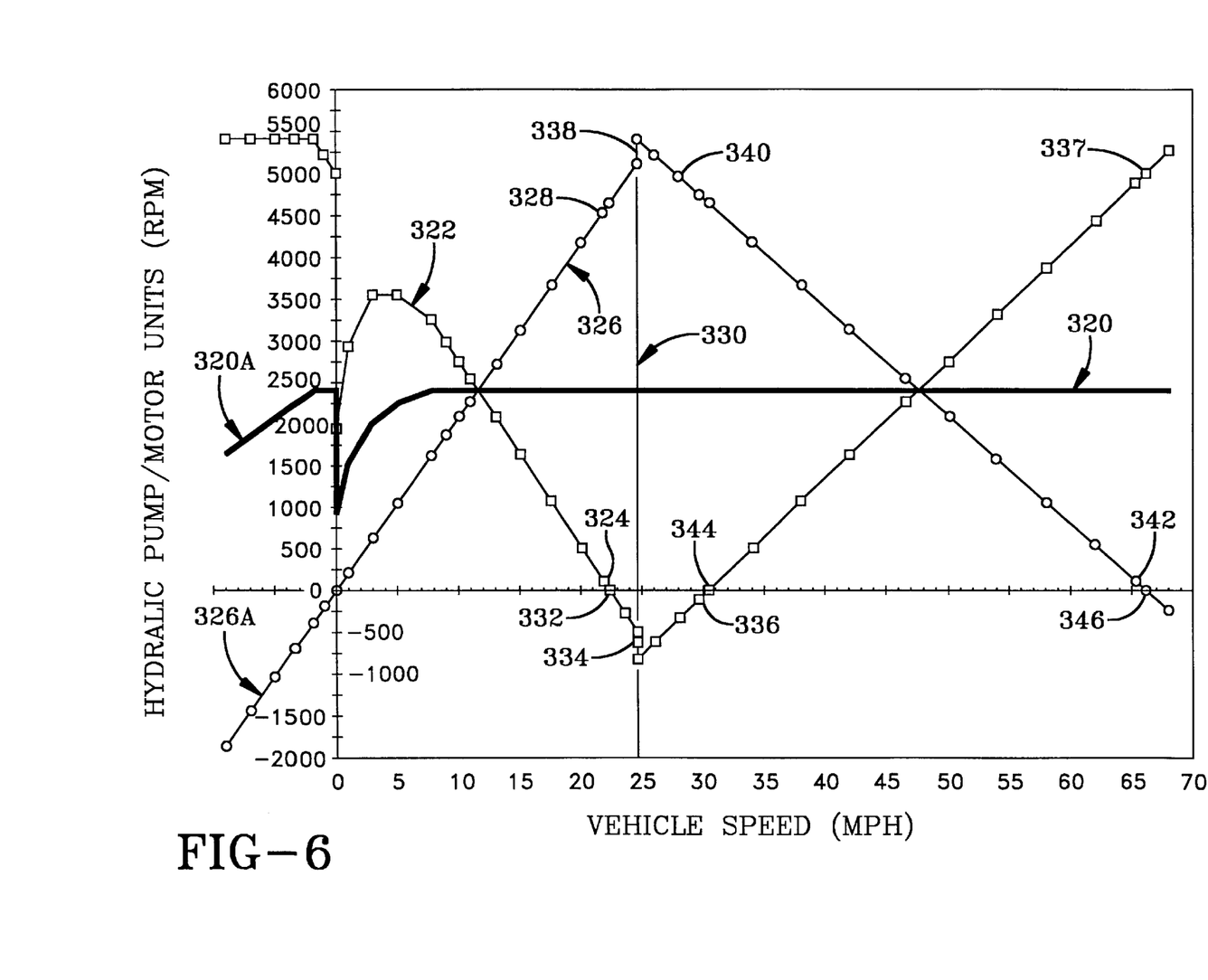
FIG. 6 is a graphical depiction of the rotations per minute (RPM) of each hydrostatic unit as well as the rotational speed of the engine, all relative to the speed of the vehicle in miles per hour (MPH) that is representative of the results which can be achieved by a transmission embodying the concepts of the present invention, as depicted in FIG. 5; and, FIG. 7 is a graphical depiction of the tractive effort afforded by a representative two-mode, compound-split, hydro-mechanical transmission such as that represented in FIG. 5 visually to display the significant tractive effort provided in reverse, even when batteries are not employed.
Figure 7:
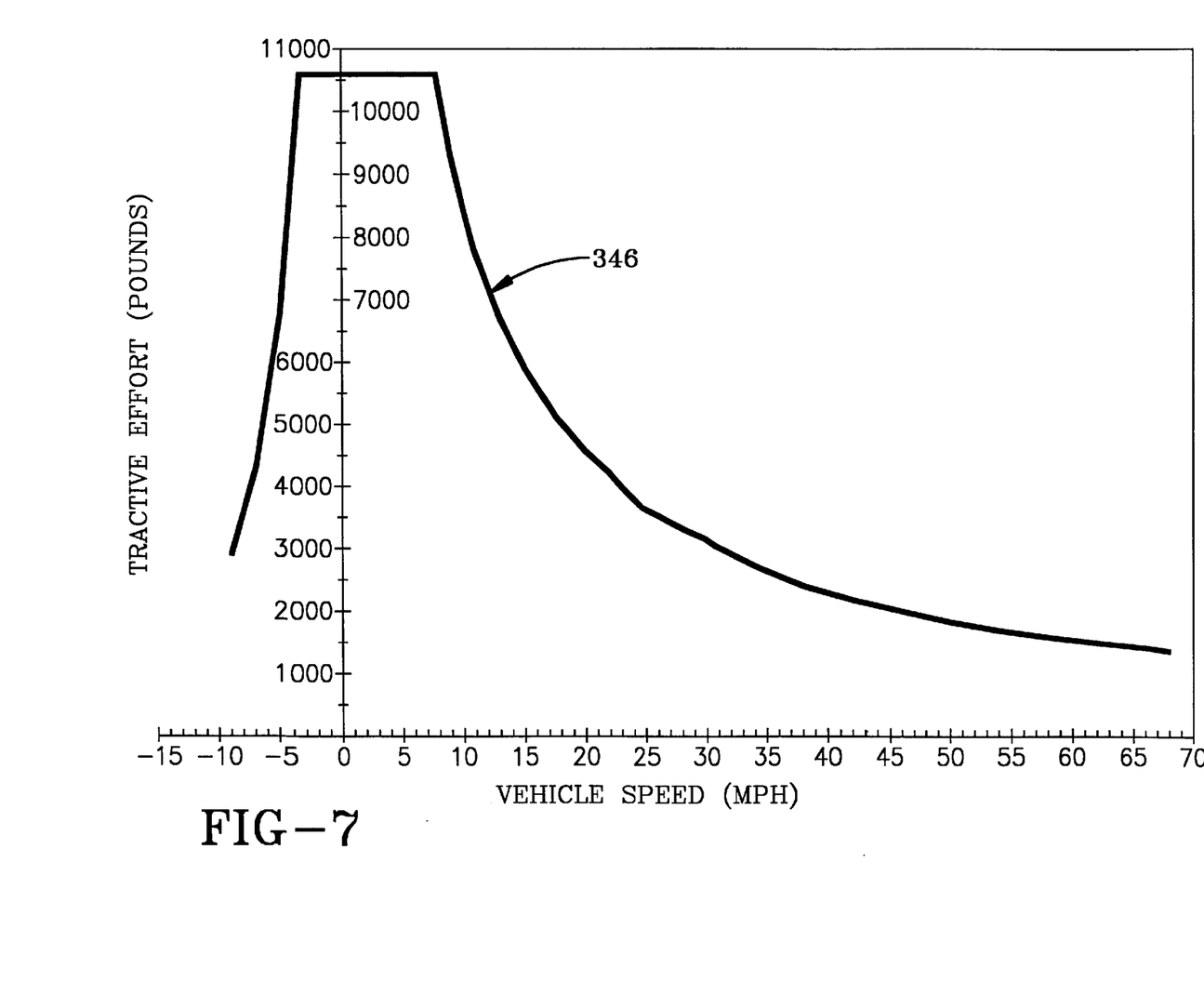

An understanding of the operational results of the first and second hydrostatic pump/motor units 264 and 274 is facilitated by reference to the plotted curves set forth on FIGS. 6 and 7. The hereinafter described plottings appearing on FIG. 6 resulted from using a 280 horsepower engine 214 capable of sustained operation at 2400 RPM. Each hydrostatic pump/motor unit 264 and 274 was rated at 160 horsepower at continuous output operating up to a maximum of 5400 RPM with about a 920 foot-pound stall. As such, and with reference to FIG. 6, curve 320 is the plot of the engine speed in revolutions per minute (RPM) against the speed in miles per hour (MPH) of the vehicle in which the engine 214 and hybrid transmission 210 are incorporated. For convenience it will be noted that curve 320 is represented as an uninterrupted, solid line to provide rapid visual identification.

Curve 322 is the plot of the rotational speed (RPM) of the first hydrostatic pump/motor unit 264, also relative to the speed (MPH) of the vehicle. Curve 322 may be readily distinguished by the fact that the plot points appear as small squares. From the initial, forward movement of the vehicle to a forward, vehicular speed of about 21.871 MPH the first hydrostatic pump/motor unit 264 operates as an hydraulic pump, but at that speed the operation of the first hydrostatic pump/motor unit 264 changes to that of an hydraulic motor and remains operating as an hydraulic motor throughout the remainder of the first mode. Plot point 324 on curve 322 designates the transitional point at which the operation of the first hydrostatic pump/motor unit 264 changes from that of an hydraulic pump to that of an hydraulic motor.

Curve 326 is the plot of the rotational speed (RPM) of the second hydrostatic pump/motor unit 274 relative to the speed (MPH) of the vehicle. Curve 326 may be readily distinguished by the fact that the plot points appear as small o's. From the initial, forward movement of the vehicle to a forward, vehicular speed of about 21.7891 MPH the second hydrostatic pump/motor unit 274 operates as an hydraulic motor, but at that speed the operation of the second hydrostatic pump/motor unit 274 changes to that of an hydraulic pump and remains operating as an hydraulic pump throughout the remainder of the first mode. Plot point 328 on curve 326 designates the transitional point at which the operation of the second hydrostatic pump/motor unit 274 changes from that of an hydraulic motor to that of an hydraulic pump.

The first operational mode of transmission 210 extends from the abscissa, which designates engine speed (RPM), to line 330 which is drawn parallel to the abscissa and which defines the shift from operation of the transmission 210 in the first mode to the second mode. In the representative embodiment described, the first mode extends from the vehicle at rest to a forward speed on the order of about 24.5339 MPH. At speeds greater than about 24.5339 MPH the transmission operates in the second mode.

As such, the first hydrostatic pump/motor unit 264 operates initially as an hydraulic pump and within the first mode changes its operation to that of an hydraulic motor. Conversely, the second hydrostatic pump/motor unit 274 operates initially as an hydraulic motor but within the first mode changes to operate as an hydraulic pump. The aforesaid transitions in the operation of the first and second hydrostatic pump/motor units 264 and 274 are the result of the number of teeth on the various gear members within the compounded planetary gear sub sets which cause the speeds of the two hydrostatic pump/motor units to reverse at various operational speeds of the vehicle.

Should one wish to duplicate the results described herein, the outer gear members 230 and 238 in each of the first and second planetary gear sub sets 220 and 222, respectively, have 99 teeth. The inner gear members 232 and 240 in each of the first and second planetary gear sub sets 220 and 224 have 57 teeth. The outer gear member 246 of the third planetary gear sub set 224 has 97 teeth, and the inner gear member 248 of the third planetary gear sub set 224 has 33 teeth. The outer gear member 254 of the fourth planetary gear sub set 226 has 94 teeth, and the inner gear member 256 of the fourth planetary gear sub set 226 has 34 teeth.

This completes the designation as to the number of teeth provided on the various gear members in the planetary gear sub sets incorporated in the embodiment depicted in FIG. 5. However, to complete the gear teeth information as to FIG. 5 it should be noted that the gear 265 has 37 teeth and the drive gear 267 with which it is meshingly engaged has 63 teeth. Similarly, the gear 275 has 43 teeth and the operating gear 277 has 57 teeth.

With the configuration of the transmission 210 heretofore described, and with the aforesaid number of teeth on the inner and outer gear members, the transmission provides a mechanical point while operating in the first mode. That is, the first hydrostatic pump/motor unit 264 has a zero rotational speed at about 22.264 MPH, as depicted by plot point 332 on curve 322.

To complete the description as to the operation of the hydrostatic pup/motor units 264 and 274 in the exemplary environment described for the alternative embodiment, one must consider operation of the transmission in the second mode as well as in the reverse modes of operation.

Second Mode

The transition from the first to the second mode of operation is also achieved by disengaging torque transfer device 282 and simultaneously applying torque transfer device 270 for the embodiment 210 depicted in FIG. 5. During the shift from the first to the second mode of operation the first hydrostatic pump/motor unit 264 transitions from operating as an hydraulic motor to operating as an hydraulic pump. Inasmuch as the transition from operation of the transmission 210 in the first mode to operation in the second mode occurs at line 330 (FIG. 6), the transition of the first hydrostatic pump/motor unit 264 from an hydraulic motor to an hydraulic pump occurs at point 334 on curve 322—which falls along the extended intersection of curve 322 with line 330. The first hydrostatic pump/motor unit 264 continues to operate as an hydraulic pump during the operation of the transmission 210 in the second mode while the vehicle gains speed from about 24.5339 MPH to about 29.6614 MPH. At about 30.4071 MPH the first hydrostatic pump/motor unit 264 transitions from operation as an hydraulic pump back to operation as an hydraulic motor. This transition is represented as point 336 on curve 322. The first hydrostatic pump/motor unit 274 continues thereafter to operate as an hydraulic motor until the vehicle reaches a speed of about 65.2272 MPH, at which speed the first hydrostatic pump/motor unit 264 retransitions from operation as an hydraulic motor to an hydraulic pump, as represented by point 337 on curve 322.

During the shift from the first to the second mode of operation the second hydrostatic pump/motor unit 274 transitions from operating as an hydraulic pump to operating as an hydraulic motor. Inasmuch as the transition from operation of the transmission 210 in the first mode to operation in the second mode occurs along line 330, the transition of the second hydrostatic pump/motor unit 274 from an hydraulic pump to an hydraulic motor occurs at point 338 on curve 326—which also falls along the extended intersection of curve 326 with line 330. In fact, the second hydrostatic pump/motor unit 274 operates as an hydraulic motor until the vehicle reaches a speed of about 29.6614 MPH, as represented by plot point 340 on curve 326, at which speed the second hydrostatic pump/motor unit 274 transitions from operation as an hydraulic motor to operation as an hydraulic pump. The second hydrostatic pump/motor unit 274 continues thereafter to operate as an hydraulic pump until the vehicle reaches a speed of 65.2274 MPH, as represented by plot point 342 on curve 326, at which point the second hydrostatic pump/motor unit 274 retransitions from an hydraulic pump to an hydraulic motor.

With the configuration of the transmission 210 heretofore described, and with the aforesaid number of teeth on the inner and outer gear members, the transmission 210 provides not only the one mechanical point while operating in the first mode, as previously described as being designated at plot point 332, but also two mechanical points while operating in the second mode. Specifically, the first hydrostatic pump/motor unit 264 also has a zero rotational speed at about 30.407 MPH—i.e.: the first mechanical point in the second mode of operation, as designated by point 344 on curve 322. In addition, the second hydrostatic pump/motor unit 274 has a zero rotational speed at 66.1163 MPH i.e.: the second mechanical point in the second mode of operation, as designated by point 346 on curve 326.

It should be understood that the exact location of the aforesaid mechanical points are determined not only by the number of teeth on the inner and outer gear members of the planetary gear sub sets, but also by the rotational speed of the input shaft 212. Hence, with the number of teeth disclosed for the inner and outer gear members in the first of the exemplary embodiments heretofore described, an increase in the speed of the input shaft 212 will shift the locations of the mechanical points to higher vehicular speeds, and conversely, a reduction in the speed of the input member 212 will shift the mechanical points to lower vehicular speeds.

Reverse Mode

Operation in the reverse mode is a virtual replication of the first mode but in the opposite direction. This unique result is occasioned by solely engaging torque transfer device 280.

By grounding the carrier 252 of the third planetary gear sub set 224 while assuring that the other two torque transfer devices 270 and 282 remain disengaged. As such, rotation of the inner gear member 248 in the third planetary gear sub set 224 against the planet gears 250 secured to a grounded carrier 252 drives the outer member 246 in a direction opposite to that of the driving inner gear member 248 which rotates the output member 276 in a direction opposite to that in which it rotates while driving the vehicle forwardly. Hence, the vehicle moves in reverse while greatly enhancing the speeds and tractive effort achievable by prior art transmissions. Hence, the presentation on FIG. 6 of the line 320A represents the engine speed in reverse and the line 326A represents the speed of the second hydrostatic unit 274 in reverse.

Summation

A two-mode, compound-split, electro-mechanical transmission such as those identified by the numerals 10 and 210, each of which embody the concepts of the present invention, provide the desired efficiency during continuous, constant-speed operation of the engine while providing at least one mechanical point during operation in the first mode and at least one mechanical point during operation in the second mode. As represented by curve 344 on FIG. 7, the transmission 210 provides high tractive effort in reverse through substantially the same range of speed as it does in the low forward range—i.e.: the first mode.

Conclusion

While only a preferred, and one alternative, embodiment as well as a variation of the preferred embodiment are disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

As should now be apparent, the present invention not only teaches that a transmission embodying the concepts of the present invention is capable of providing high overall efficiency, particularly at high output speeds, but also that the tractive effort is considerably enhanced, particularly during operation in reverse. Moreover, the other objects of the invention are likewise accomplished.

What is claimed is:

1. A two-mode, compound-split, hybrid transmission comprising:

an input member for receiving power from a prime mover power source;

an output member for delivering power from the transmission;

first, second, third and fourth compounded planetary gear sub sets;

first and second supplemental power receiving/delivery units continuously connected to said compounded planetary gear sub sets;

at least one component of said third and fourth planetary ear sub sets continuously connected to said output member;

three torque transfer devices directly connected to at least one component of each of said four planetary gear sub sets;

two of said three torque transfer devices selectively ground selected members of said third and fourth compounded planetary gear sub sets;

the remaining one torque transfer device of said three torque transfer devices selectively connecting selected members of said first and second compounded planetary gear sub sets to said output member;

one of said three torque transfer devices being solely engaged to effect a first mode of forward operation by said transmission;

another of said torque transfer devices being solely engaged to effect a second mode of forward operation by said transmission; and, the third of said three torque transfer devices being solely engaged virtually to replicate the forward operation but in a reverse direction.

2. The two-mode, compound-split, hybrid transmission, as set forth in claim 1, wherein:

said four compounded planetary gear sub sets each utilize first and second gear members;

said first and second gear members of each planetary gear sub set meshingly engaging a plurality of planet gears mounted on a carrier incorporated in each corresponding planetary gear sub set;

said first supplemental power receiving/delivery unit being continuously connected to the inner gear member of said first planetary gear sub set as well as to the outer gear member of said second planetary gear sub set;

said second supplemental power receiving/delivery unit being continuously connected to the inner gear member of said second, third and fourth planetary gear sub sets;

said outer gear member of said third planetary gear sub set and said carrier of said fourth planetary gear sub set continuously connected to said output member.

3. The two-mode, compound-split, hybrid transmission, as set forth in claim 2, wherein:

one of said three torque transfer devices selectively grounds the outer gear member of said fourth planetary gear sub set;

one of said three torque transfer devices selectively connects the carrier of said fourth planetary gear sub set to the carriers of said first and second planetary gar sub sets; and, the third of said three torque transfer devices selectively grounds the carrier of said third planetary gear sub set.

4. The two-mode, compound-split, hybrid transmission, as set forth in claim 3, wherein:

solely engaging that torque transfer device which selectively grounds the outer gear member of said fourth planetary gear sub set effects operation of said transmission in said first forward mode.

5. The two-mode, compound-split, hybrid transmission, as set forth in claim 3, wherein:

solely engaging that torque transfer devices which selectively connects the carrier of said fourth planetary gear sub set to the carriers of said first and second planetary gar sub sets effects operation of said transmission in said second forward mode.

6. The two-mode, compound-split, hybrid transmission, as set forth in claim 3, wherein:

solely engaging that torque transfer device which selectively grounds the carrier of said third planetary gear sub set effects operation of said transmission in said reverse mode.

7. The two-mode, compound-split, hybrid transmission, as set forth in claim 6, wherein:

said first and second supplemental power receiving/delivery units are first and second electrical motor/generator units.

8. The two-mode, compound-split, hybrid transmission, as set forth in claim 6, wherein:

said first and second supplemental power receiving/delivery units are first and second hydraulic pump/motor units.

9. A two-mode, compound-split, hybrid transmission comprising:

an input member for receiving power from a prime mover power source;

an output member for delivering power from the transmission;

first and second supplemental power receiving/delivery units;

four planetary gear sub sets;

each planetary gear sub-set utilizing first and second gear members;

said first and second gear members of each planetary gear sub-set meshingly engaging a plurality of planet gears mounted on a carrier incorporated in each corresponding planetary gear sub-set;

at least one of said gear members in said first and second planetary gear sub sets connected to said first supplemental power receiving/delivery unit;

at least one of said gear members in said second, third and fourth planetary gear sub sets continuously connected to said second supplemental power receiving/delivery unit;

means selectively to connect said carriers associated with said first, second and fourth planetary gear sub sets to each other and to said output member;

means selectively to connect the carrier associated with said third planetary gear sub-set to ground;

means continuously connecting that gear member of said third planetary gear sub-set not connected to said second supplemental power receiving/delivery unit to said carrier of said fourth planetary gear sub-set; and, means selectively to ground that gear member of said fourth planetary gear sub-set not connected to said second supplemental power receiving/delivery unit.

10. A two-mode, compound-split, hybrid transmission, as set forth in claim 9, wherein the various means selectively to connect as well as the means selectively to ground comprise:

three torque transfer devices.

11. The two-mode, compound-split, hybrid transmission, as set forth in claim 10, wherein:

those gear members of said first and second planetary gear sub sets continuously connected to said first supplemental power receiving/delivery units being the sun gear in said first planetary gear sub-set and the ring gear in said second planetary gear sub-set.

12. The two-mode, compound-split hybrid transmission, as set forth in claim 11, wherein:

the gear members of said second, third and fourth planetary gear sub sets continuously connected to said second supplemental power receiving/delivery units being a ring gear in each of said planetary gear sub sets.

13. The two-mode, compound-split hybrid transmission, as set forth in claim 12, wherein:

said input member being operatively connected to said ring gear o said first planetary gear sub set.

14. The two-mode, compound-split, hybrid transmission, as set forth in claim 13, wherein:

said planet gears in said first and second planetary gear arrangements are selectively connected to said planet gears in said third planetary gear arrangement;

said planet gears in said third planetary gear arrangement are continuously connected to said output member.

15. The two-mode, compound-split, hybrid transmission, as set forth in claim 14, wherein:

said first and second supplemental power receiving/delivery units are first and second electrical motor/generator units.

16. The two-mode, compound-split, hybrid transmission, as set forth in claim 14, wherein:

said first and second supplemental power receiving/delivery units are first and second hydraulic pump/motor units.

* * * * *